US009777645B2

(12) United States Patent
Evans et al.

(10) Patent No.: US 9,777,645 B2
(45) Date of Patent: Oct. 3, 2017

(54) NATURAL GAS LEAK DETECTION THROUGH PRESSURE LOSS IN PNEUMATIC STARTER AND PRELUBE

(71) Applicant: Cummins Inc., Columbus, IN (US)

(72) Inventors: Timothy R. Evans, Columbus, IN (US); Andrew G. Kitchen, Newnham (GB); Jeffrey S. O'Neill, Columbus, IN (US); Michael A. LeNeave, Columbus, IN (US)

(73) Assignee: Cummins Inc., Columbus, IN (US)

( * ) Notice: Subject to any disclaimer, the term of this patent is extended or adjusted under 35 U.S.C. 154(b) by 6 days.

(21) Appl. No.: 15/186,059

(22) Filed: Jun. 17, 2016

(65) Prior Publication Data

US 2016/0369711 A1  Dec. 22, 2016

Related U.S. Application Data

(60) Provisional application No. 62/180,685, filed on Jun. 17, 2015.

(51) Int. Cl.
| F02D 41/22 | (2006.01) |
| F02D 19/02 | (2006.01) |
| F02M 21/02 | (2006.01) |
| F02D 41/00 | (2006.01) |
| F02N 7/00 | (2006.01) |
| F01M 5/02 | (2006.01) |
| F01M 3/02 | (2006.01) |

(52) U.S. Cl.
CPC ............ *F02D 19/025* (2013.01); *F01M 3/02* (2013.01); *F01M 5/025* (2013.01); *F02D 19/022* (2013.01); *F02D 19/027* (2013.01); *F02D 41/0027* (2013.01); *F02D 41/22* (2013.01); *F02M 21/023* (2013.01); *F02M 21/0245* (2013.01); *F02N 7/00* (2013.01); *F01M 2005/026* (2013.01); *F02D 2041/225* (2013.01); *F02D 2200/0602* (2013.01); *F02M 21/0215* (2013.01); *Y02T 10/40* (2013.01)

(58) Field of Classification Search
CPC .... F02D 19/025; F02D 19/027; F02D 19/022; F02D 41/0027; F02D 41/22; F02D 2200/0602; F02D 2041/225; F01M 3/02; F01M 5/025; F01M 2005/026; F02N 7/00; F02M 21/0245; F02M 21/023; F02M 21/0215; Y02T 10/40
USPC .................... 123/196 S, 198 D, 179.31, 529
See application file for complete search history.

(56) References Cited

U.S. PATENT DOCUMENTS

| 6,467,466 B1 | 10/2002 | Maekawa et al. |
| 7,322,345 B2 | 1/2008 | Saito et al. |
| 7,856,965 B2 | 12/2010 | Crisan |

*Primary Examiner* — Hai Huynh
(74) *Attorney, Agent, or Firm* — Faegre Baker Daniels LLP

(57) ABSTRACT

An internal combustion engine, a method of operating the internal combustion engine, and a controller are disclosed. The method may comprise measuring a first pressure at a first position in a fluid line containing pressurized fluid; comparing the first pressure to a first threshold; in response to the first pressure exceeding the first threshold, transmitting a signal to depressurize the fluid line; after transmitting the signal to depressurize the fluid line, measuring a second pressure in the fluid line and comparing the second pressure to at least one of a second threshold and a third threshold, the second threshold being greater than the third threshold and less than the first threshold; and in response to the second pressure being less than the second threshold and exceeding the third threshold, transmitting another signal to depressurize the fluid line.

20 Claims, 4 Drawing Sheets

NATURAL GAS LEAK DETECTION THROUGH PRESSURE LOSS IN PNEUMATIC STARTER AND PRELUBE

CROSS-REFERENCE TO RELATED APPLICATIONS

The present application claims the benefit of U.S. Provisional Patent Application No. 62/180,685, filed Jun. 17, 2015, which is incorporated herein in its entirety by reference.

TECHNICAL FIELD

Generally, the present disclosure relates to leak detection in an internal combustion engine. More specifically, this disclosure relates to detecting gas leaks in a high pressure gas line of an internal combustion engine.

BACKGROUND

Pressurized fuel gas may be used to pneumatically power prelubrication and starter systems. The pressurized gas is delivered to the prelubrication and starter systems through a high pressure fuel gas line at a pressure sufficient to provide power to these systems. The high pressure gas line (e.g., 150 psi) may be separate from a low pressure gas line (e.g., less than 5 psi), which is used to deliver fuel gas to the engine for combustion, and both lines may utilize the same fuel gas. Thus, leaks in the high pressure fuel gas line can cause problems during engine operation, such as auto-ignition, for example, in cases which the high pressure gas line is in close proximity to parts of the engine hot enough to ignite leaked fuel gas. Diesel engines are sometimes configured to utilize pressurized air to pneumatically power the prelubrication and starter systems and thus are not challenged by the same auto-ignition problem in their pneumatic prelubrication and starter systems.

Furthermore, pressurized fuel gas is often provided to the high pressure gas line by a user-operated, manual switch. When the engine is not running, unnecessary periods of activation that deliver pressurized gas to the high pressure gas line, prelubrication system, or starter system having a leak can result in the build-up of gas near the engine. The build-up of fuel gas may further contribute to the auto-ignition problem.

The background to the disclosure is described herein, including reference to acts, materials, devices, and the like, to explain the context of the present invention. This is not to be taken as an admission or a suggestion that any of the material referred to was published, known or part of the common general knowledge in the art to which the present invention pertains, in the United States or in any other country, as at the priority date of any of the claims.

SUMMARY OF DISCLOSED EMBODIMENTS

Embodiments of an internal combustion engine, a method of operating the internal combustion engine, and a controller structured to implement the method are disclosed. Generally, the disclosed embodiments address the problems identified above. In an embodiment of the method of operating an internal combustion engine, the method comprises measuring a first pressure in a fluid line between two valves closed to contain pressurized fluid; if the pressure exceeds a first threshold, transmitting a signal to depressurize the fluid line; after transmitting the signal, measuring a second pressure in the fluid line and if the second pressure is less than a second threshold and greater than a third threshold, transmitting another signal to depressurize the fluid line. Of course the fluid line may include branches, each including a valve to form a closed system at the time when the first pressure and the second pressure are measured. The foregoing method can be applied to determine whether a leak is present in the fluid line and also to ensure that the fluid line is depressurized when it should be.

In some embodiments, a method of operating an internal combustion engine comprises measuring a first pressure at a first position in a fluid line containing pressurized fluid, the fluid line coupled to a first valve downstream of the first position and to a second valve upstream of the first position, each of the first valve and the second valve being in a closed position when measuring the first pressure; comparing the first pressure to a first threshold; in response to the first pressure exceeding the first threshold, transmitting a signal to depressurize the fluid line; after transmitting the signal to depressurize the fluid line, measuring a second pressure in the fluid line and comparing the second pressure to at least one of a second threshold and a third threshold, the second threshold being greater than the third threshold and less than the first threshold; and in response to the second pressure being less than the second threshold and exceeding the third threshold, transmitting another signal to depressurize the fluid line.

In some embodiments, an engine system comprises an internal combustion engine; a fluid line including a first valve and a second valve upstream of the first valve; a pump fluidly coupled to the fluid line downstream of the first valve and operable by pressurized fluid in the fluid line; a pressure sensor; and a controller communicatively coupled to the first valve, the second valve, and the pressure sensor, the controller being structured to: measure a first pressure at a first position in the fluid line, the first position being between the first valve and the second valve, each of the first valve and the second valve being in a closed position; compare the first pressure to a first threshold; in response to the first pressure exceeding the first threshold, transmit a signal to depressurize the fluid line; after transmitting the signal to depressurize the fluid line, measure a second pressure in the fluid line and compare the second pressure to at least one of a second threshold and a third threshold, the second threshold being greater than the third threshold and less than the first threshold; and in response to the second pressure being less than the second threshold and exceeding the third threshold, transmit another signal to depressurize the fluid line.

In some embodiments, a controller for an engine system comprises an interface structured to communicate with a first valve, a second valve, and a pressure sensor of the engine system, the first valve positioned downstream of the second valve in a fluid line including a pump downstream of the first valve and operable by pressurized fluid in the fluid line, the controller structured to: measure a first pressure at a first position in the fluid line, the first position being between the first valve and the second valve, each of the first valve and the second valve being in a closed position; compare the first pressure to a first threshold; in response to the first pressure exceeding the first threshold, transmit a signal to depressurize the fluid line; after transmitting the signal to depressurize the fluid line, measure a second pressure in the fluid line and compare the second pressure to at least one of a second threshold and a third threshold, the second threshold being greater than the third threshold and less than the first threshold; and in response to the second pressure being less than the second threshold and exceeding the third threshold, transmit another signal to depressurize the fluid line.

Figure 1:
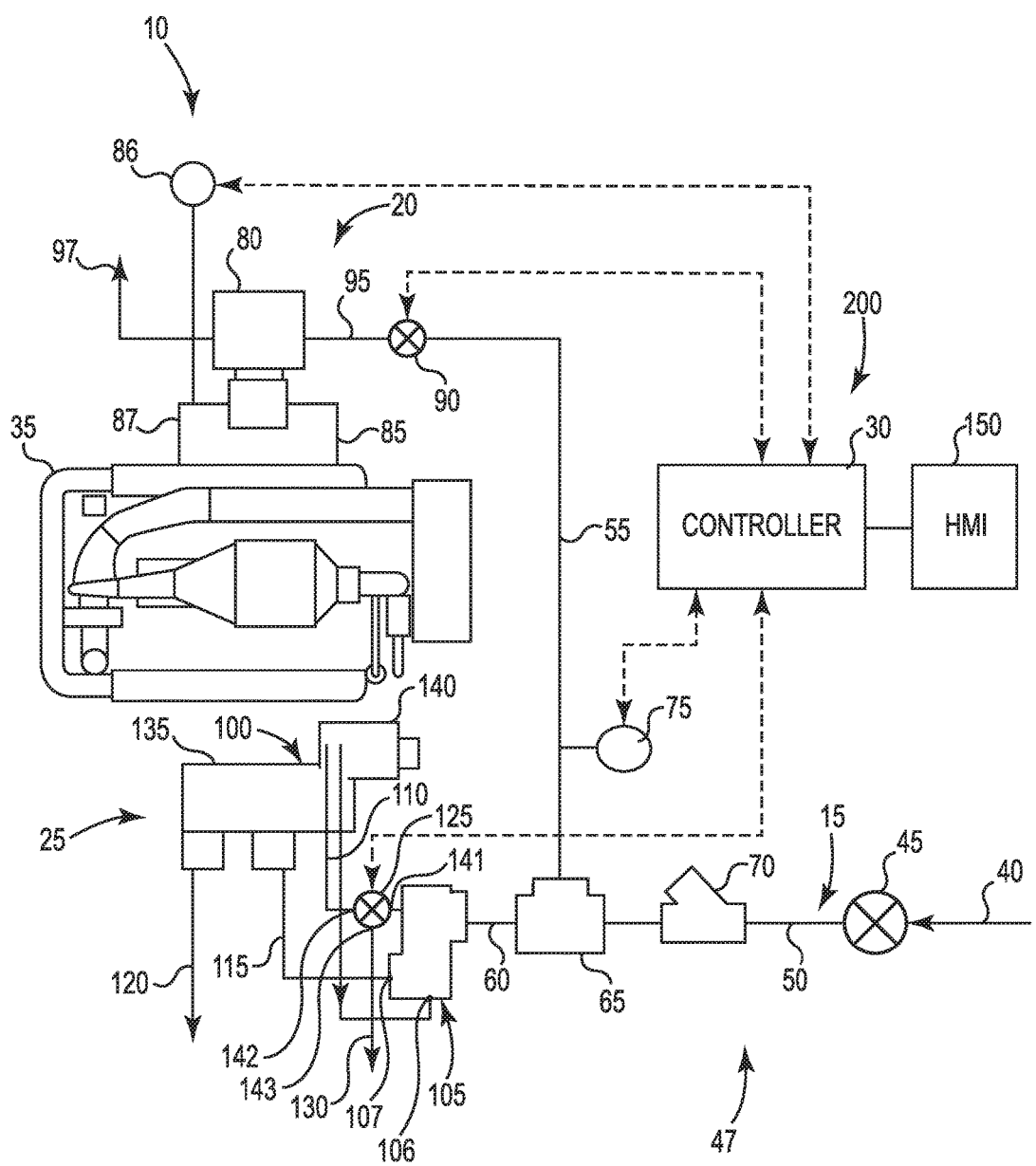
FIG. 1 is a partial schematic illustration of an engine system according to some embodiments.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

FIG. 1 is a partial schematic illustration of an engine system 10 according to some embodiments. As illustrated, engine system 10 includes a fluid line 15, a prelubrication system 20 fluidly coupled to and powered by the fluid line 15, a starter system 25 fluidly coupled to and powered by the fluid line 15, a controller 30 coupled to one or more components of the engine system 10, and an internal combustion engine 35 selectively coupled to the prelubrication system 20 and the starter system 25. A prelubrication valve 90 closes flow of the fluid to the prelubrication system 20. A starter valve 125 closes flow of the fluid to the starter system 25. A fluid shutoff valve 45 closes flow of the fluid from a fluid supply source. The prelubrication valve 90 or the starter valve 125 may be referred to as the first valve, the fluid shutoff valve 45 may be referred to as the second valve, and the other of the prelubrication valve 90 and the starter valve 125 may be referred to as the third valve. The components shown are related to a pneumatic system of engine system 10 for prelubrication and starter operations performed as part of a startup sequence to engage the internal combustion system (10) before the internal combustion engine 35 operates in a run mode. The engine system 10 may include other components that contribute to the operation of the engine, such as a prelubrication oil pressure sensor. While the present embodiment is described with reference to the prelubrication system 20 and the starter system 25, it should be understood that the leak detection method described herein is applicable to an engine system with one or the other of the prelubrication system 20 and the starter system 25, or both, and, generally, to an engine system in which the pressurized fluid is used to pneumatically power one or more systems other than prelubrication and starting systems.

An example prelubrication operation utilizes the prelubrication system 20 to provide oil to bearings in the internal combustion engine 35 to reduce wear over time of the bearings due to stresses at startup, which may increase their lifecycle. An example starter operation utilizes the starter system 25 to provide power to initially rotate the crankshaft of the internal combustion engine 35. The crankshaft may be powered by the starter system 25, for example, until it reaches a threshold engine speed. After the threshold engine speed is reached, combustion events provide the continuing power to rotate the crankshaft in a run mode.

In some embodiments, the engine system 10 includes a supply line 40 and the fluid shutoff valve 45 coupled to the fluid line 15. The supply line 40 supplies a pressurized fluid, such as pressurized fuel gas, to the fluid line 15 for use by one or more components of the engine system 10.

The fluid line 15 transmits fluid into and out of one or more components in the engine system 10 to provide pneumatic power, for example. As illustrated, the fluid line 15 is coupled to the prelubrication system 20 and the starter system 25 to provide pneumatic power thereto. In some instances, for example, the fluid line 15 is supplied pressurized natural gas from the supply line 40 to about 150 pounds per square inch of pressure (psi), which is transmitted through one or more of the systems 20, 25 to provide pneumatic power for prelubrication and starting.

After pressurized fluid flows through the prelubrication system 20 or the starter system 25, for operation of these systems as commanded by the controller 30, the pressurized fluid is discharged from the fluid line. The pressurized fluid may be vented, preferably away from the hot spots of the internal combustion engine 35. In some embodiments, the pressurized fluid is a fuel gas, such as natural gas, also used for combustion in the internal combustion engine 35. Generally, a fuel gas is combustible and may auto-ignite in some circumstances. In other embodiments, the pressurized fluid is inert or less combustible than a fuel gas (e.g., air), and therefore less likely to auto-ignite than the fuel gas. In yet other embodiments, the pressurized fluid is a pressurized liquid.

As shown, the fluid shutoff valve 45 is positioned at the end of the supply line 40 to regulate the transmission of pressurized fluid to the fluid line 15 by opening and closing. In particular, the fluid shutoff valve 45 is positioned between the supply line 40 and the fluid line 15. In various embodiments, the fluid shutoff valve 45 is controlled manually by a user of the engine system 10 during a startup sequence. In other embodiments (not shown), the fluid shutoff valve 45 is in operative communication with the controller 30 to receive opening or closing commands. Operative communication may include a wired connection, for example, or any suitable connection to transmit and receive a command, signal, energy, and/or data.

The term "upstream," as used herein, refers to a position along a line (e.g., the fluid line 15 of the engine system 10) being closer to and/or in the direction of the supply (e.g., supply line 40) than another position along the line. Accordingly, the term "downstream," as used herein, refers to the opposite of upstream. Therefore, fluid from the supply line 40 flows downstream to the fluid line 15.

In the illustrated embodiment, a pneumatic system of the engine system 10 comprises the fluid shutoff valve 45, the fluid line 15, the prelubrication system 20 and/or the starter system 25, which cooperate to provide pneumatic power for prelubrication and starter operations of the engine system. As herein described in more detail elsewhere, the engine system 10 is capable of detecting leaks, for example, in the pneumatic system that cause problems in the engine system 10.

In various embodiments, the fluid line 15 includes a main line 50, a prelubrication branch 55, a starter branch 60, and a tee fitting 65 coupling the main line 50 to each branch 55, 60 and providing a fluid connection for transmission of pressurized fluid from the main line to the branches. The main line 50 receives the pressurized fluid from the supply line 40 and transmits it to the branches 55, 60. The prelubrication branch 55 is fluidly coupled to the prelubrication system 20. The starter branch 60 is fluidly coupled to the starter system 25.

In some embodiments, the engine system 10 includes a strainer 70 and a sensor 75 positioned along the fluid line 15. As illustrated, the strainer 70 is positioned along the main line 50 of the fluid line 15 to filter particulates from the pressurized gas so that the prelubrication system 20 and the starter system 25 receive filtered pressurized gas. In other embodiments (not shown), the strainer 70 is positioned at other places along the fluid line 15 or even upstream of the fluid shutoff valve 45.

In some embodiments, the sensor 75 is positioned downstream of the fluid shutoff valve 45, upstream of the prelubrication system 20, and upstream of the starter system 25. The sensor 75, as shown, is positioned along the prelubrication branch 55 of the fluid line 15. However, in other embodiments, the sensor 75 is positioned along the main line 50 or the starter branch 60. In various embodiments, the sensor 75 measures pressure in the fluid line. The position of the sensor 75 may be referred to as the first position, where pressure is measured within the fluid line 15 to determine if the fluid line is pressurized or sufficiently depressurized to prevent engagement of a pump positioned downstream of the prelubrication valve 90 or the starter valve 125. In one example, the sensor 75 is a ratiometric pressure sensor. The controller 30 is in operative communication with the sensor 75 to receive a signal indicating a pressure in the fluid line 15. A pressure value may be determined in response to the received signal as herein described in more detail elsewhere. In some embodiments, the sensor 75 is implemented as a direct sensor for measuring the pressure in the fluid line 15. In other embodiments, the sensor 75 is an indirect (or virtual) sensor measuring a characteristic related to the pressure in the fluid line 15, and the pressure in the fluid line 15 can be determined in response thereto. In various embodiments, the sensor 75 comprises one or more pressure switches to detect pressure changes and rates of change, for example, based on a state and hysteresis response of the one or more switches or one or more pressure setting differences between switches.

In some embodiments, the prelubrication system 20 selectively lubricates the internal combustion engine 35 and includes a prelubrication pump 80, oil conduits 85, 87 coupled to the internal combustion engine 35 and the prelubrication pump 80, a prelubrication valve 90 upstream of the prelubrication pump 80, an intake line 95 coupled to the prelubrication pump 80 and the prelubrication valve 90, and a venting line 97 coupled to the prelubrication pump 80. The prelubrication pump 80, in operation, draws in lubricating oil through the oil conduit 85, from an oil pan for example, and delivers the lubricating oil through the oil conduit 87 to one or more bearings in the internal combustion engine 35, through an oil rifle for example. The prelubrication pump 80 is pneumatically powered by pressurized fluid delivered through the intake line 95. Pressurized fluid is also vented during operation through venting line 97. Venting line 97 may vent the pressurized fluid to the ambient environment or atmosphere, for example, away from the internal combustion engine 35.

The prelubrication valve 90 controls the flow of pressurized gas from the fluid line 15 to the other components of the prelubrication system 20. In the various embodiments, the prelubrication valve 90 is a two-way valve that transitions between an open position and a closed position. In the illustrated embodiment, the prelubrication valve 90 is coupled between the intake line 95 of the prelubrication system 20 and the prelubrication branch 55 of the fluid line 15.

As shown, the prelubrication valve 90 is in operative communication with the controller 30 to receive one or more commands, such as open or close. One example of a prelubrication valve 90 includes a solenoid actuator. One example of an open command is the delivery of current to activate the solenoid actuator in the prelubrication valve 90. In the present example, the solenoid actuator is normally closed by a biasing force. When the solenoid actuator is powered, it overcomes the biasing force to open. Other solenoid actuators can be normally opened, and current is applied to cause them to close.

In various embodiments, the starter system 25 selectively starts the internal combustion engine 35 and includes a starter 100 selectively coupled to the internal combustion engine 35, a relay valve 105 upstream of the starter 100, an engagement conduit 110 coupled between the starter 100 and the relay valve 105, an intake line 115 coupled between the starter 100 and the relay valve 105, a first venting line 120 coupled to the starter 100, a starter valve 125 coupled along the engagement conduit 110, and a second venting line 130 coupled to the starter valve 125.

The relay valve 105 receives pressurized fluid and delivers the pressurized fluid to at least two outlets, including an engagement outlet 106 and a main outlet 107, with the main outlet 107 receiving pressurized fluid in response to the flow of pressurized fluid through the engagement outlet 106. For example, the relay valve 105 splits the pressurized fluid received into two portions, one portion flowing through the engagement outlet 106 and the other portion selectively flowing through the main outlet 107. In the illustrated embodiment, the selective flow through the main outlet 107 is normally blocked by an internal pinion in the relay valve 105 unless pressurized fluid flows through the engagement outlet 106. As shown, the relay valve 105 is coupled to the starter branch 60 of the fluid line 15 to receive pressurized fluid, the engagement conduit 110 to deliver an engagement portion of the fluid, and the intake line 115 to deliver a main portion of the fluid.

The starter 100 selectively couples to the internal combustion engine 35 to rotate the crankshaft of the internal combustion engine 35. In some embodiments, the starter 100 includes a turbine assembly 135 for rotating the crankshaft and an engagement assembly 140 for selectively coupling the starter 100 to the internal combustion engine 35. The turbine assembly 135 converts pressurized fluid into a rotational force in response to a main flow of pressurized fluid. The engagement assembly 140 engages the internal combustion engine 35 in response to an engagement flow of pressurized fluid to deliver the rotational force from the turbine assembly 135 to the internal combustion engine 35. In the illustrated embodiment, the starter 100 is normally disengaged from the internal combustion engine 35 unless pressurized fluid flows through the engagement assembly 140. As shown, the turbine assembly 135 is coupled to the intake line 115 to receive the main flow of pressurized fluid and is coupled to the first venting line 120 to vent the main flow of pressurized fluid, for example, to the ambient environment or atmosphere. Also, as shown, the engagement assembly 140 is coupled to the engagement conduit 110 to receive the engagement flow of pressurized fluid through one port and to vent the engagement flow of pressurized fluid through another port.

The starter valve 125 controls the flow of pressurized gas from the fluid line 15 to other components of the starter system 25. In various embodiments, the starter valve 125 is a three-way valve that transitions among at least two positions and includes a first port 141, a second port 142, and a third port 143. In the illustrated embodiment, the starter valve 125 is coupled along the engagement conduit 110, to receive an engagement flow of pressurized fluid via the first port 141 and to deliver the engagement flow of pressurized fluid via the second port 142, and coupled to the second venting line 130 to vent the engagement flow of pressurized fluid via the third port 143, for example, to the ambient environment or atmosphere. In some embodiments, the starter valve 125 transitions between an engagement flow position that allows pressurized fluid to flow through the engagement conduit 110 (from first port 141 to second port 142) and a venting position that transmits pressurized fluid from the engagement conduit to the second venting line 130 (from second port 142 to third port 143).

As shown, the starter valve 125 is in operative communication with the controller 30 to receive one or more commands to transition to the one or more positions. One example of a starter valve 125 includes a solenoid actuator. One example of a command is the delivery of current to transition a solenoid in the starter valve 125 to a position (e.g., engagement flow or venting).

In the illustrated embodiment, the starter system 25 operates to selectively provide pneumatic power to the starter 100 to engage and to rotate the crankshaft of the internal combustion engine 35. For example, to provide pneumatic power, pressurized fluid is flowed into the relay valve 105 and the starter valve 125 is placed into the engagement flow position, and in response, an engagement flow of pressurized fluid begins to flow through the engagement outlet of the relay valve 105, through the engagement conduit 110, and into the engagement assembly 140 of the starter 100. In response to the engagement flow, the starter 100 begins to engage the internal combustion engine 35. Also, in response to the engagement flow, the relay valve 105 begins to open the internal pinion to allow pressurized fluid to flow through the main outlet of the relay valve 105, through the intake line 115, into the turbine assembly 135 of the starter 100 to begin rotating the crankshaft of the internal combustion engine 35, and out through the first venting line 120 to the ambient environment.

After the engine has started, the starter system 25 selectively removes pneumatic power from the starter 100. For example, to remove pneumatic power, the starter valve 125 is transitioned into the venting position, and in response, the engagement flow of pressurized fluid ceases to flow through the engagement outlet of the relay valve 105 and instead begins to flow out of the second venting line 130 into the ambient environment to release pressure in the engagement conduit 110. In response to the ceased engagement flow and/or released pressure in the engagement conduit 110, the engagement assembly 140 of the starter 110 begins to disengage from the internal combustion engine 35. Also, in response to the ceased engagement flow and/or released pressure in the engagement conduit 110, the relay valve 105 begins to close the internal pinion to prevent pressurized fluid from flowing through the main outlet of the relay valve 105, which causes the turbine assembly 135 to cease rotating.

The controller 30 performs certain operations to control one or more components of the engine system 10. The controller 30 may be a single device or a distributed device, and the functions of the controller may be performed by hardware and/or as computer instructions on a non-transient computer readable storage medium.

In certain embodiments, the engine system 10 includes a processing subsystem 200 including one or more computing devices having memory components, processing components, and communication hardware including the controller 30. In some embodiments, the processing subsystem 200 includes the controller 30, the valves 90, 125, and the sensor 75.

The processing subsystem 200 detects leaks in the engine system 10 in response to measurements provided by sensor 75 along the fluid line 15 and controls one or more valves, such as the prelubrication valve 90 and/or the starter valve 125. In various embodiments, the sensor 75 is positioned downstream of the fluid shutoff valve 45, upstream of the prelubrication valve 90, and upstream of the starter valve 125. A non-limiting list of problems detectable by the processing subsystem 200 include: a leak in the fluid line 15, a leak in the prelubrication system 20, a leak in the starter system 25, an open or leaky fluid shutoff valve 45, an open or leaky prelubrication valve 90, an open or leaky starter valve 125, an open or leaky relay valve 105, or other leaks or failures in the components of the engine system 10.

Figure 2:
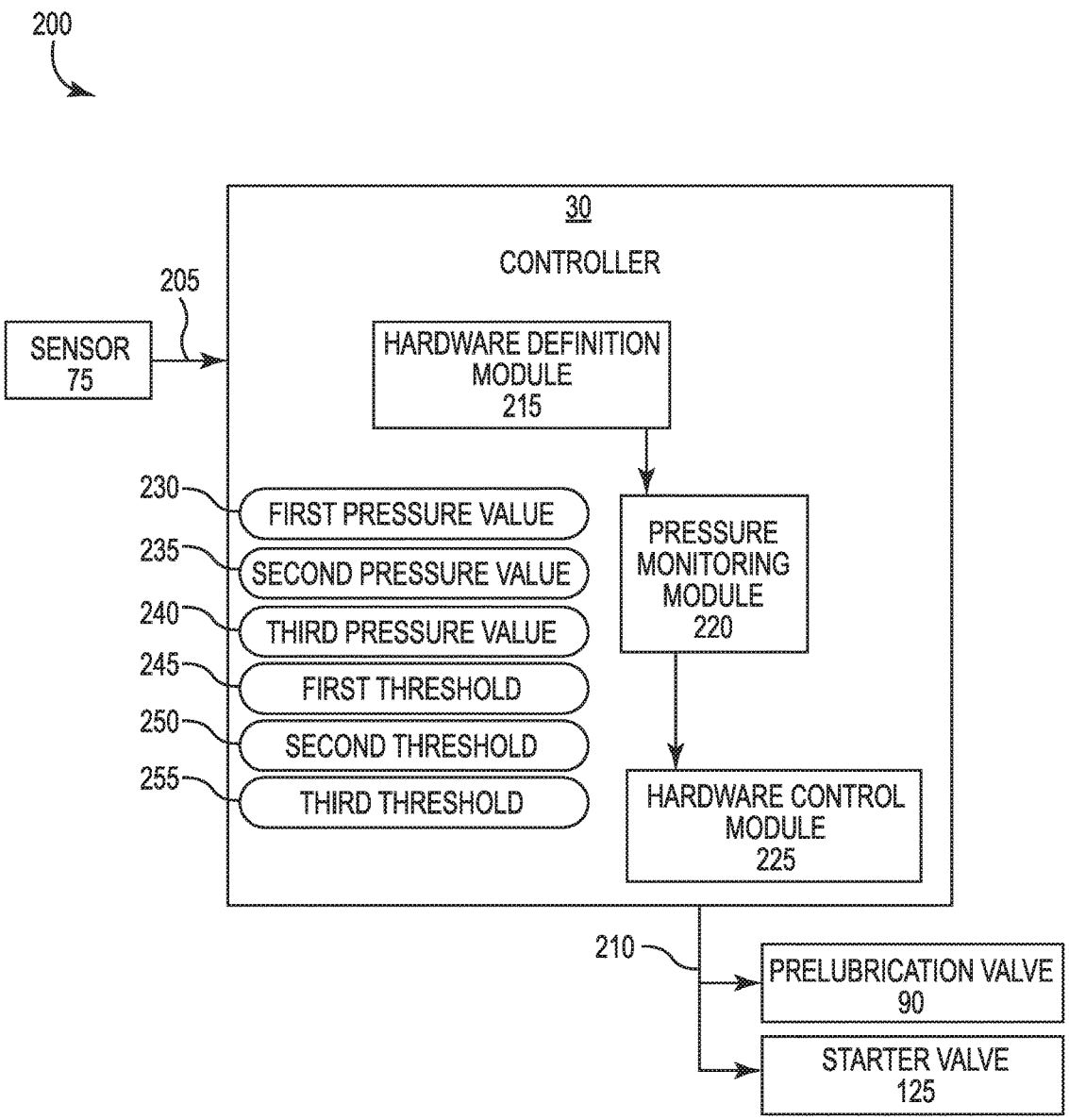
FIG. 2 is a schematic illustration of a processing subsystem of the engine system of FIG. 1 according to some embodiments.

FIG. 2 is a schematic illustration of the processing subsystem 200 including the controller 30 according to some embodiments. The controller 30 receives one or more input signals 205 and provides one or more output signals 210. In some embodiments, the controller 30 includes one or more modules, such as a hardware definition module 215, a pressure monitoring module 220, and a hardware control module 225. In various embodiments, the controller 30 further includes one or more parameters (stored, for example, as data in a memory device), which are available for further processing or output and which may include a first pressure value 230, a second pressure value 235, a third pressure value 240, a first threshold 245, a second threshold 250, and a third threshold 255. As described herein in more detail, in some embodiments, the controller 30 performs one or more operations of the processes 300, 400 discussed with reference to FIGS. 3 and 4.

In the illustrated embodiment, the one or more input signals 205 are received from the sensor 75. In some embodiments, the input signal 205 indicates a pressure measurement in the fluid line 15, e.g. main line 50, branch 55, and/or branch 60.

Also, in the illustrated embodiment, the one or more output signals 210 are provided to the prelubrication valve 90 and the starter valve 125. In some embodiments, the output signal(s) 210 include a control signal indicating a command for a valve to open, close, or transition to a position between open and close.

In various embodiments, the modules 215, 220, 225 functionally execute the operations of the controller. The description herein including modules emphasizes the structural independence of certain aspects of the controller 30, and illustrates one grouping of operations and responsibilities of the controller. Other groupings that execute similar overall operations are understood to be within the scope of the present application. Modules may be implemented in hardware, or as computer instructions on a non-transient computer readable storage medium, or as a combination of hardware and software. Modules may be distributed across various hardware or computer based components.

Non-limiting examples of module implementation elements include sensors (e.g., sensor 75) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Also, in some embodiments, the controller 30 performs certain operations described herein to interpret and/or to determine one or more parameters or data structures. Interpreting or determining, as utilized herein, includes receiving values by any method known in the art, including at least receiving values from a datalink or network communication, receiving an electronic signal (e.g., a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In the illustrated embodiment, the hardware definition module 215 interprets one or more parameters for use by the controller 30, such as first pressure value 230, second pressure value 235, and third pressure value 240. In some embodiments, the pressure values 230, 235, 240 are interpreted in response to the input signal(s) 205. Non-limiting examples of pressure values relate to one or more of: an absolute pressure, a pressure change over time (e.g., pressure decay or build-up rate), a pressure differential, and an average pressure.

The hardware definition module 215 as illustrated does not include sensor 75. In other embodiments, the hardware definition module 215 includes hardware components, such as one or more sensors (e.g., sensor 75), hardware to couple to the sensor(s), and a non-transient computer-readable storage medium for storing signals or data received from the sensor(s). In various embodiments, the hardware definition module 215 including hardware excludes one or more of these components.

In some embodiments, one or more of the threshold values, such as first threshold 245, second threshold 250, and third threshold 255, are available for use by the controller 30 in a memory component (not shown) of the controller. In various embodiments, one or more of the threshold values 245, 250, 255 are received by the controller 30, such as through input signal(s) 205. In further embodiments, the threshold values 245, 250, 255 are interpreted in response to calibrated thresholds for a particular engine system and/or current or predicted engine system conditions.

In the illustrated embodiment, the pressure monitoring module 220 compares one or more threshold values 245, 250, 255 in response to one or more pressure values 230, 235, 240. In response to the comparison, the pressure monitoring module 220 determines one or more operations to be performed by a component coupled to the controller 30. Non-limiting examples of operations to be performed include: measuring a sensor value (e.g., pressure), providing a warning to a human-machine interface (HMI) (e.g., for high pressure or low pressure), providing a recommendation to a user of the engine system (e.g., shutoff recommendation), opening or closing a prelubrication valve, transitioning a starter valve to a position, opening or closing a gas shutoff valve, and continuing engine operation. In some embodiments, the pressure monitoring module 220 includes hardware components, such as a memory component store received and providable parameter(s) and a processing component to compare and determine a parameter in response to another parameter. In other embodiments, the pressure monitoring module 220 including hardware excludes one or more of these components.

The hardware control module 225 provides one or more commands to carry out the operation(s) determined by the pressure monitoring module 220, for example in the form of output signal(s) 210. In various embodiments, the hardware control module 225 includes hardware components, such as one or more valves (e.g., valves 90, 125), hardware to couple to the valves, and a signal generator to provide power to the valve(s). In other embodiments, the hardware control module 225 excludes one or more of these hardware components.

Figure 3:
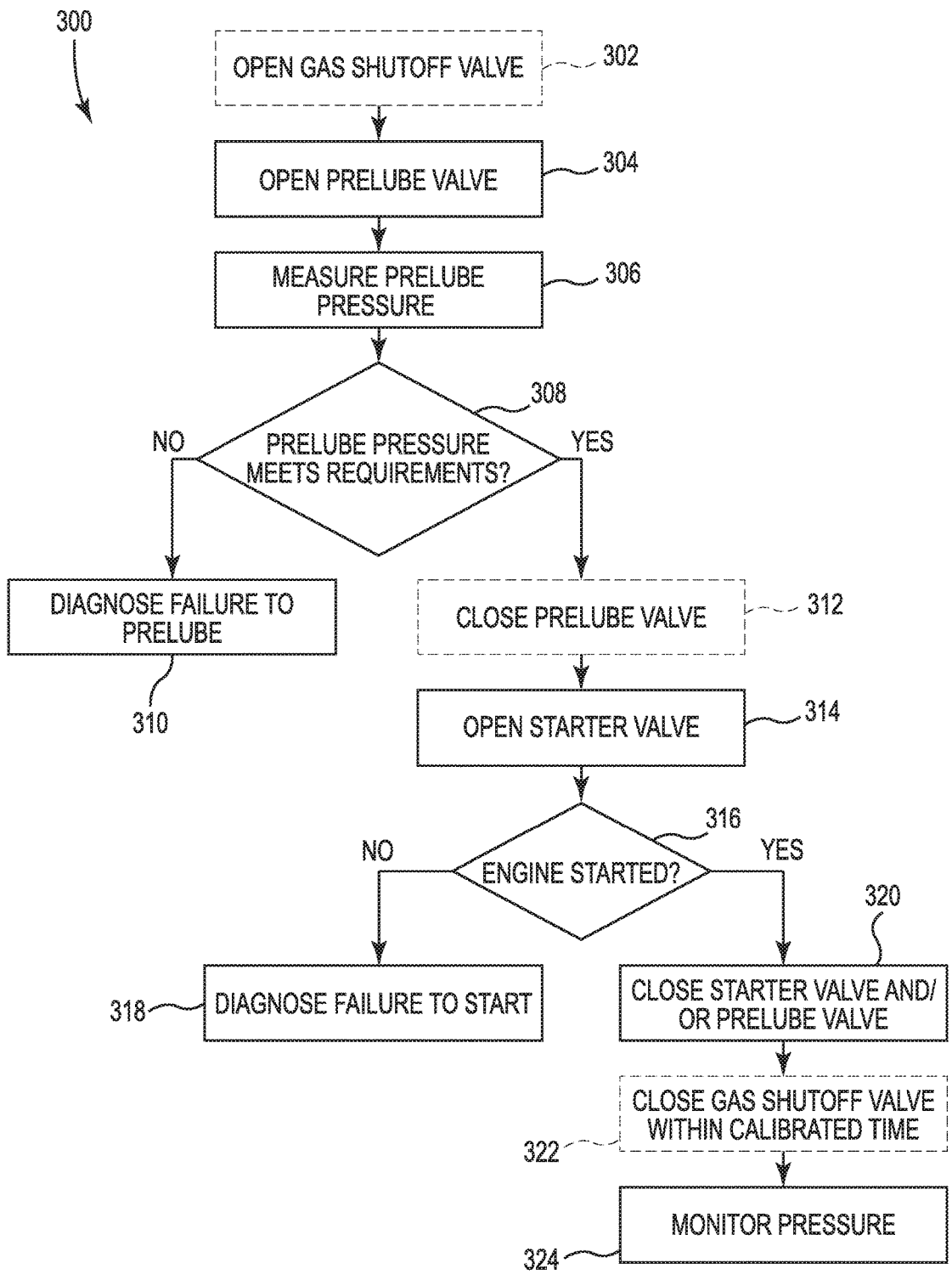
FIG. 3 is an illustration of a process for transitioning the engine system of FIG. 1 to a run mode according to some embodiments.

FIG. 3 is an illustration of a process 300 for transitioning an engine system from prelube and start to a run mode according to some embodiments. In some embodiments, the process 300 is performed on an engine system having a fluid line coupled to a starter system and a prelubrication system. Process 300 may be utilized with engine system 10, for example, and one or more operations in the process may be controlled by or performed in the controller 30 or processing subsystem 200, discussed with reference to FIG. 1. In various embodiments, the process 300 is a subprocess for bringing a system online.

In the illustration, the process 300 begins with operation 302 that opens the fluid shutoff valve 45 and allows a pressurized fluid, such as pressurized gas, to flow into the fluid line 15 to begin pressure delivery for providing pneumatic power. Operation 302 may be performed by hand (e.g., manual switch or lever), by the controller 30, or by other suitable control means to control a fluid shutoff valve 45. As shown, operation 302 is carried out manually by the user of the engine system. Alternatively, operation 302 may comprise presentation of instructions on a display instructing an operator to perform the manual operation. The display may be comprised by a human-machine interface (HMI) 150.

In operation 304, a prelubrication valve is opened and allows the pressurized fluid in the fluid line to flow to the prelubrication system to provide pneumatic power to a prelubrication pump, for example, to begin the prelubrication process for the engine and to activate the prelubrication system 20. The prelubrication process reduces wear on certain moving parts, such as bearings, in the engine and can facilitate an increased lifecycle.

In operation 306, pressure is measured by one or more sensors at one or more points in the prelubrication system 20. For example, a pressure related to the oil conduit 85, 87 is measured by a prelubrication oil pressure sensor 86 positioned along the prelubrication system 20.

In operation 308, the measured pressure is compared to various pressure requirements, for example, to determine if the pressure is satisfactory for prelubrication. If the measured pressure does not meet the requirements, the process 300 continues to operation 310 to diagnose the failure to prelube the engine. Otherwise, if the measured prelube pressure meets the requirements, the process 300 optionally continues to operation 312 to close the prelubrication valve 90, thereby ending the prelubrication process and deactivating the prelubrication system 20. In some instances, the prelubrication process from beginning to end takes 2-3 minutes, for example. However, a person having skill in the art and the benefit of this disclosure would be able to select an appropriate prelubrication time for a particular engine system. In various embodiments, instead of performing operation 312, the process 300 continues to operation 314. In various embodiments, the process 300 continues to operation 314 and performs operation 312 concurrently with operation 314, at least for a portion of the time operation 314 is carried out.

Operation 314 is performed to open the starter valve 125 to allow the pressurized fluid to flow to the starter system 25 to provide pneumatic power to a starter 100, for example, to activate the starter system 25 and begin the starting process for the internal combustion engine 35. In some instances, the starting process involves the starter 100 engaging the internal combustion engine 35 and rotating the crankshaft of the internal combustion engine 35 up to a certain speed. In some instances, the certain speed is a predetermined speed. In some instances, the starting process involves the starter 100 engaging the engine and rotating the crankshaft of the internal combustion engine 35 until the start of combustion or for a predetermined not-to-exceed time.

In operation 316, the process 300 checks whether the internal combustion engine 35 has successfully started. For example, the internal combustion engine 35 may have reached a certain engine speed and fluid has been provided to the engine through a low pressure fluid line for combustion. If the internal combustion engine 35 has not successfully started, operation 318 is performed to diagnose the failure to start. On the other hand, if the internal combustion engine 35 has successfully started, operation 320 is performed to close the starter valve 125 to depressurize the starter system 25 of pressurized fluid, for example, to end the starting process and deactivate the starter system 25. In some instances, depressurizing the starter system 25 causes the starter 100 to disengage from the internal combustion engine 35. In various instances, the starting process from beginning to end takes less than 10 seconds, for example. However, a person having skill in the art and the benefit of this disclosure would be able to select an appropriate engine start time for a particular engine system. In alternative embodiments, the prelubrication valve 90 is closed concurrently with the closure of the starter valve 125 after the engine is successfully started. The controller 30 may determine whether the internal combustion engine 35 has or has not successfully started by measuring pressures and temperatures in any known manner, for example by measuring combustion chamber or exhaust system pressures and temperatures.

Operation 322 is then performed to close the fluid shutoff valve 45 within a calibrated time. Similar to operation 302, operation 322 is optionally performed manually. The closing of the fluid shutoff valve 45 prevents additional pressurized fluid from entering into the fluid line 15 thereby ending the pressure delivery. After operation 322 is performed on engine system 10, for example, the prelubrication valve 90, starter valve 125, and gas shutoff valve 45 are closed. If the fluid shutoff valve 45 is not closed, this may cause problems with the engine system 10 as herein described elsewhere.

In operation 324, the pressure along the fluid line 15 is monitored, for example, by sensor 75 on engine system 10. By monitoring the pressure along the fluid line 15 with the valves closed, leaks and other problems related to the prelubrication system 20 and starter system 25 can be diagnosed.

Figure 4:
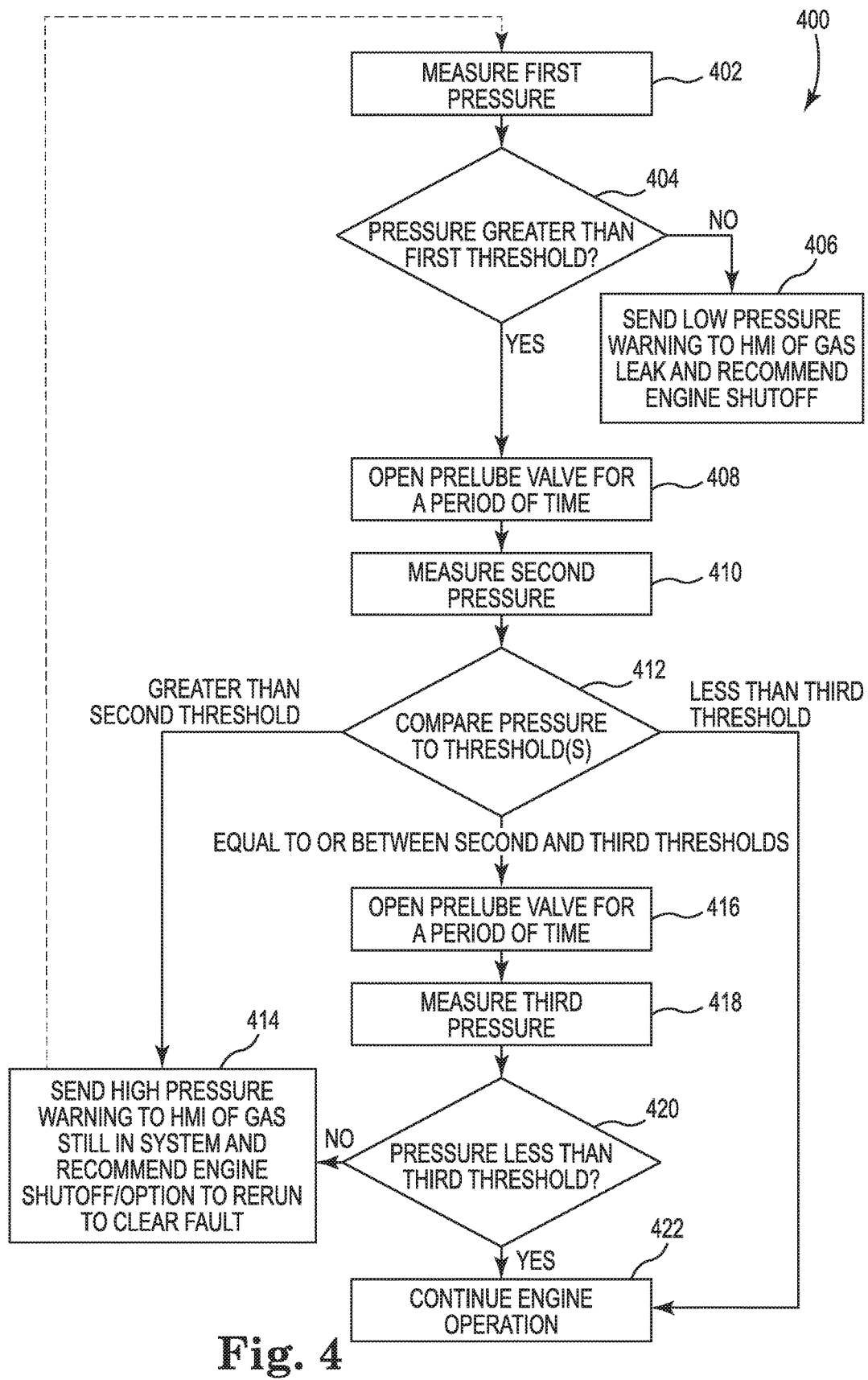
FIG. 4 is an illustration of a process for monitoring pressure in the engine system of FIG. 1 according to some embodiments.

FIG. 4 is an illustration of a process 400 for monitoring pressure in an engine system according to some embodiments. The process 400 is performed on an engine system 10 having a sensor 75 coupled to a fluid line 15 between a starter system 25, a prelubrication system 90, and a fluid shutoff valve 45. Process 400 may be utilized with engine system 10, for example, and one or more operations in the process may be controlled by and/or performed in the controller 30 or processing subsystem 200, discussed with reference to FIG. 1. In various embodiments, the process 400 is a subprocess for transitioning an engine system 10 to a run mode, such as process 300 discussed with reference to FIG. 3, and is performed after the internal combustion engine 35 has started.

Process 400 begins with operation 402 to measure a first pressure 230 in the fluid line 15 after a prelubrication valve (e.g., prelubrication valve 90) and a starter valve (e.g., starter valve 125) have been closed. In some embodiments, the first pressure measurement 230 is a pressure change over time measurement (e.g., pressure decay or build-up rate). The pressure measurements performed by process 400 may also include, but are not limited to, other types of pressure measurements relating to: an absolute pressure, a pressure differential, and an average pressure. In addition, the pressure measurements in process 400 may be received from a sensor, such as sensor 75 discussed with reference to FIG. 1.

In operation 404, the first pressure 230 is compared to a first threshold 245. If the first pressure 230 is less than or equal to the first threshold 245, this indicates an unacceptable fluid leak or a valve failure, and a low pressure warning is issued in operation 406 that sends a warning to a human-machine interface (HMI) 150 of a fluid leak or other fault condition. The operation 406 may also recommend engine shutoff to a user of the engine system 10 and/or optionally return to operation 402 to rerun the process 400 (not shown), for example, at the direction of the user. Otherwise, if the first pressure 230 is greater than the first threshold 245, the fluid line is depressurized. The fluid line may be depressurized in operation 408 by opening the prelubrication valve 90 for the period of time. Opening the prelubrication valve 90 may vent the fluid in the fluid line. The fluid may be captured and provided to the engine for combustion rather than released to the environment. The fluid line may also be depressurized in operation 408 by opening the starter valve 125 for a period of time.

In some embodiments, the first threshold 245 is a pressure value lower than the pressure in the fluid line 15 at valve closure, which recognizes an acceptable amount of pressure loss after valve closure. An acceptable amount of pressure loss after valve closure may be due to, for example, a valve that is unable to close quickly when operating within specifications. However, in other embodiments, the first threshold 245 is equal to the expected pressure in the fluid line 15 at valve closure. In other embodiments, the first pressure 230 and the first threshold 245 relate to a pressure decay, and accordingly, a warning in operation 406 is sent if the first pressure exceeds the first threshold 245 (e.g., indicates more pressure has been lost than is acceptable). Whether a pressure decay or absolute pressure is measured and compared, the principles of the process 400 remain the same for the comparisons between any pressure and any threshold.

Then, operation 410 is performed to measure a second pressure 235. The second pressure measurement may be similar to or different from the first pressure measurement. In operation 412, the second pressure 235 is compared to one or more thresholds. In the illustrated embodiment, the second pressure 235 is compared to a second threshold 250 and a third threshold 255, and the second threshold 250 is greater than the third threshold 255. In various embodiments, the first threshold 245 is greater than the second threshold. In other embodiments, there is no direct relationship between the various thresholds, for example, when the first threshold 245 is related to a pressure decay value and a second threshold 250 that is related to an absolute pressure value.

If the second pressure 235 is greater than the second threshold 250, this indicates that an unacceptable amount of pressurized fluid is still in the system, and a high pressure warning is issued in operation 414 that sends a warning to the HMI 150 of fluid still in the engine system 10. In some instances, the high pressure may indicate that the fluid shutoff valve 45 has not been closed. In various instances, with a fluid shutoff valve 45 being manually controlled by the user, the HMI 150 warning provides notice to the user to check closure of the fluid shutoff valve 45. The operation 414 may also recommend engine shutoff or an option to rerun one or more operation in process 400 (e.g., operations 410, 412) to clear the fault code.

If the second pressure 235 is less than the third threshold 255, this indicates normal behavior, and the process 400 continues to operation 422 to continue engine operation.

Otherwise, if the second pressure 235 is equal to or between the second and third thresholds 250, 255, this indicates that more fluid needs to be discharged from the fluid line 15. The prelubrication valve 90 may be opened for a period of time in operation 416 to discharge the fluid pressure. The fluid line may also be depressurized in operation 4016 by opening the starter valve 125 for a period of time. A third pressure 240 is then measured in operation 418. The third pressure 240 may be similar to or different than the second pressure 235.

In operation 420, the third pressure 240 is compared to the third threshold 255. If the third pressure 240 is less than the third threshold 255, this indicates normal behavior, and the process 400 continues to operation 422 to continue engine operation. Otherwise, if the third pressure 240 is greater than or equal to the third threshold 255, this indicates that an unacceptable amount of pressurized fluid is still in the system, and a high pressure warning is issued in operation 414 that sends a warning to the HMI 150 of fluid still in the engine system 10.

After operation 414, the process 400 optionally returns to operation 402 to rerun the process 400, for example, at the direction of the user. By being warned in either operation 414 or operation 406, the user may have further information to take appropriate steps to address the high pressure or low pressure condition and troubleshoot problems or leaks in engine system 10 at least downstream of the fluid shutoff valve 45.

In this manner, the engine system 10, discussed with reference to FIG. 1, processing subsystem 200, discussed with reference to FIG. 2, and processes 300, 400, discussed with reference to FIGS. 3 and 4, are suited to detect leaks or other problems in the pneumatic system that provides power to prelubrication and starter systems 20, 25 in an engine system 10.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The following is claimed:

1. A method of operating an internal combustion engine, the method comprising:
measuring a first pressure at a first position in a fluid line containing pressurized fluid, the fluid line coupled to a first valve downstream of the first position and to a second valve upstream of the first position, each of the first valve and the second valve being in a closed position when measuring the first pressure;
comparing the first pressure to a first threshold;
in response to the first pressure exceeding the first threshold, transmitting a signal to depressurize the fluid line;
after transmitting the signal to depressurize the fluid line, measuring a second pressure in the fluid line and comparing the second pressure to at least one of a second threshold and a third threshold, the second threshold being greater than the third threshold and less than the first threshold; and
in response to the second pressure being less than the second threshold and exceeding the third threshold, transmitting another signal to depressurize the fluid line.

2. The method of claim 1, further comprising opening the first valve and the second valve to actuate a pump with the pressurized fluid.

3. The method of claim 2, wherein the pump is a prelubrication pump or a starter pump.

4. The method of claim 1, wherein the first valve is a prelubrication valve in a prelubrication system of the internal combustion engine or a starter valve in a starter system of the internal combustion system, and the second valve is a gas shutoff valve coupled to a gas supply line.

5. The method of claim 1, wherein the pressurized fluid comprises a fuel gas, further comprising supplying the fuel gas at a high pressure to actuate a starter system or a prelubrication system of the internal combustion engine, and supplying the fuel gas at a low pressure for combustion by the internal combustion engine.

6. The method of claim 1, further comprising closing the first valve, the second valve, and a third valve in the fluid line before measuring the first pressure at the first position, wherein the first valve is a prelubrication valve in a prelubrication system of the internal combustion engine, the second valve is a gas shutoff valve coupled to a gas supply line, and the third valve is a starter valve in a starter system of the internal combustion system.

7. The method of claim 1, further comprising, in response to the second pressure being less than the third threshold, continuing operation of the internal combustion engine.

8. The method of claim 1, further comprising, after transmitting the another signal to depressurize the fluid line:
measuring a third pressure in the fluid line;
comparing the third pressure to at least one of the second threshold and the third threshold; and
in response to the third pressure being less than the third threshold, continuing operation of the internal combustion engine.

9. The method of claim 8, further comprising, in response to the third pressure exceeding the third threshold, providing a warning.

10. The method of claim 1, wherein the signal to depressurize the fluid line is configured to open the first valve while the second valve is closed.

11. The method of claim 1, further comprising, in response to the first pressure being less than the first threshold, providing a warning.

12. The method of claim 1, further comprising, in response to the second pressure exceeding the second threshold, providing a warning.

13. An engine system comprising:
   an internal combustion engine;
   a fluid line including a first valve and a second valve upstream of the first valve;
   a pump fluidly coupled to the fluid line downstream of the first valve and operable by pressurized fluid in the fluid line;
   a pressure sensor; and
   a controller communicatively coupled to the first valve, the second valve, and the pressure sensor, the controller being structured to:
      measure a first pressure at a first position in the fluid line, the first position being between the first valve and the second valve, each of the first valve and the second valve being in a closed position;
      compare the first pressure to a first threshold;
      in response to the first pressure exceeding the first threshold, transmit a signal to depressurize the fluid line;
      after transmitting the signal to depressurize the fluid line, measure a second pressure in the fluid line and compare the second pressure to at least one of a second threshold and a third threshold, the second threshold being greater than the third threshold and less than the first threshold; and
      in response to the second pressure being less than the second threshold and exceeding the third threshold, transmit another signal to depressurize the fluid line.

14. The engine system of claim 13, wherein the controller is further configured to open the first valve and the second valve to actuate the pump with the pressurized fluid.

15. The engine system of claim 13, wherein the pump is a prelubrication pump or a starter pump.

16. The engine system of claim 13, wherein the pump comprises two pumps including a prelubrication pump and a starter pump, further comprising a third valve downstream of the second valve, the first valve configured to control flow of the pressurized fluid to the prelubrication pump, the third valve configured to control flow of the pressurized fluid to the starter pump, and the second valve configured to control flow of the pressurized fluid from a gas supply line to the first valve and the third valve.

17. The engine system of claim 13, wherein the controller is further configured to, after transmitting the another signal to depressurize the fluid line:
   measure a third pressure in the fluid line;
   compare the third pressure to at least one of the second threshold and the third threshold; and
   in response to the third pressure being less than the third threshold, continue operation of the internal combustion engine.

18. A controller for an engine system, the controller comprising:
   an interface structured to communicate with a first valve, a second valve, and a pressure sensor of the engine system, the first valve positioned downstream of the second valve in a fluid line including a pump downstream of the first valve and operable by pressurized fluid in the fluid line, the controller structured to:
      measure a first pressure at a first position in the fluid line, the first position being between the first valve and the second valve, each of the first valve and the second valve being in a closed position;
      compare the first pressure to a first threshold;
      in response to the first pressure exceeding the first threshold, transmit a signal to depressurize the fluid line;
      after transmitting the signal to depressurize the fluid line, measure a second pressure in the fluid line and compare the second pressure to at least one of a second threshold and a third threshold, the second threshold being greater than the third threshold and less than the first threshold; and
   in response to the second pressure being less than the second threshold and exceeding the third threshold, transmit another signal to depressurize the fluid line.

19. The controller of claim 18, wherein the controller is further configured to transmit signals to the first valve and to the second valve to open the first valve and the second valve and thereby actuate the pump with the pressurized fluid.

20. The controller of claim 18, wherein the controller is further configured to, after transmitting the another signal to depressurize the fluid line:
   measure a third pressure in the fluid line;
   compare the third pressure to at least one of the second threshold and the third threshold; and
   in response to the third pressure being less than the third threshold, continue operation of the internal combustion engine.

* * * * *